US010882299B2

(12) United States Patent
Hotz et al.

(10) Patent No.: US 10,882,299 B2
(45) Date of Patent: Jan. 5, 2021

(54) METHOD AND DEVICE FOR APPLYING AN ELEMENT TO A COMPONENT PART BY USE OF A MANIPULATOR

(71) Applicant: SIKA TECHNOLOGY AG, Baar (CH)

(72) Inventors: Ernst Hotz, Schönau (DE); Wolf-Peter Sander, Nidderau (DE)

(73) Assignee: SIKA TECHNOLOGY AG, Baar (CH)

( * ) Notice: Subject to any disclaimer, the term of this patent is extended or adjusted under 35 U.S.C. 154(b) by 230 days.

(21) Appl. No.: 15/861,180

(22) Filed: Jan. 3, 2018

(65) Prior Publication Data
US 2018/0244032 A1    Aug. 30, 2018

(30) Foreign Application Priority Data

Jan. 11, 2017   (DE) .................. 10 2017 100 448
Sep. 4, 2017    (DE) .................. 10 2017 120 243

(51) Int. Cl.
*B32B 38/18*   (2006.01)
*B25J 15/06*   (2006.01)
*B32B 37/12*   (2006.01)

(52) U.S. Cl.
CPC ....... *B32B 38/1858* (2013.01); *B25J 15/0616* (2013.01); *B25J 15/0683* (2013.01); *B32B 37/12* (2013.01); *B32B 2307/102* (2013.01); *B32B 2605/08* (2013.01)

(58) Field of Classification Search
CPC .... B29C 7/44; B30B 5/02; B30B 9/22; B32B 37/10; B32B 37/1009; B32B 37/1018; B32B 38/1858
See application file for complete search history.

(56) References Cited

FOREIGN PATENT DOCUMENTS

| FR | 2848976 A1 | * | 6/2004 | ......... B29C 66/5326 |
|----|------------|---|--------|------------------------|
| FR | 2848976 A1 |   | 6/2004 |                        |
| WO | 9948673 A1 |   | 9/1999 |                        |

OTHER PUBLICATIONS

Machine translation of FR-2848976-A1.*
Nov. 25, 2019 Office Action issued in Korean Patent Application No. 10-2018-0003462.

* cited by examiner

*Primary Examiner* — Christopher T Schatz
(74) *Attorney, Agent, or Firm* — Oliff PLC (57) ABSTRACT

A method for applying, in particular for evenly pressing across a surface, a component to a construction part by way of a manipulator, by receiving the component to be applied by means of a first vacuum pressure in a first interstice between a supporting member and the component, displacing the manipulator with the component towards the construction part, disposing the component at at least one partial surface of the construction part by way of the manipulator, where, during disposing, a second vacuum pressure is generated in a second interstice between the supporting member and the construction part, and mounting the component at the construction part by increasing the difference between the first and second vacuum pressures, where the manipulator continuously maintains the first vacuum pressure until completion of arrangement and at least partial attachment of the component at the construction part.

18 Claims, 5 Drawing Sheets

METHOD AND DEVICE FOR APPLYING AN ELEMENT TO A COMPONENT PART BY USE OF A MANIPULATOR

CROSS REFERENCE TO RELATED APPLICATIONS

This application claims the benefit of German Patent Application Number DE 10 2017 100 448.3 filed on Jan. 11, 2017 and of German Patent Application Number DE 10 2017 120 243.9 filed on Sep. 4, 2017, the contents of which said applications are incorporated herein by reference in their entirety.

TECHNICAL FIELD

The present disclosure relates to a method for applying, in particular for pressing, a component to a construction part by way of a manipulator.

BACKGROUND

In automotive engineering, components, in particular foils, pads or the like, are manually applied in particular for structure-borne sound attenuation, or are applied by way of a robot to a body part. With excessively high contact pressure there is a risk to deform the body part, whereas with a pressure being too high or with an uneven contact pressure, air pockets under the component to be applied may be caused, in particular under the foil or the pads to be applied, in particular if they are to be fully adhered, what is desirable in attenuation applications. When using too low or uneven contact pressure or if air pockets arise, it may furthermore result in that, in a further production step, such as for example immersing the body part in a lacquer bath or the like, separation between the component and the body part may result, e.g. since fluid flows in between the component and the construction part, thus dissolving the adhesive bond.

From EP 0 986 457 A1, a device for mounting an acoustically effective foil has become known. The device is used for mounting a foil onto a construction part, the device comprising a closed frame, which is formed with a flexible membrane for holding and applying the foil. The foil is initially disposed on the flexible membrane. The membrane is mounted above a concave support. For mounting to a construction part, air that is to be found between the foil and the construction part, is withdraw by suction. For this purpose, the frame sealingly abuts the construction part, vacuum pressure ports for withdrawing the air are furthermore provided on the frame. By way of the flexible membrane, onto which the foil is applied and which, in its resting position, convexly extends to one side of the construction part, the foil initially is received and is lifted up, and in a successive step, in which the foil is to be mounted to the construction part, the membrane with the foil is being approached to the construction part by withdrawing the air, which is present between the construction part and the membrane, through the vacuum pressure ports. In this way, the membrane conformingly applies to the foil and the construction part. During this procedure, the case may be that the membrane closely adheres to the construction part, thus inhibiting further withdrawal of air, so that between the foil and the construction part air entrapments arise. Moreover, the foil previously is required to be manually applied onto the membrane and to be exactly aligned. Perpendicular mountings or mountings, wherein the manipulator applies the foil from the top to the bottom, e.g. on the floor of the passenger compartments of a motor vehicle, generally are not possible, since the foil otherwise will fall off the support, upon pivoting the manipulator.

BRIEF SUMMARY

Thus, provided herein is a method, by which a component may automatically be applied by way of a manipulator to a construction part, wherein the drawbacks of prior art will be avoided.

According to the disclosure, the method for applying a component onto a construction part, in particular for evenly pressing across a surface, by way of a manipulator comprises the following steps:

1. Receiving the component to be applied by means of a first vacuum pressure in a first interstice between a supporting member and the component.

The first interstice advantageously comprises a first partial interstice between the supporting member and the membrane and a second partial interstice between the membrane and the component. Hence, the first and second partial interstices are separated from each other by way of the membrane, together forming the first interstice between the supporting member and the component For the generation of the first vacuum pressure, two alternative embodiments of the disclosure are suitable:

According to a first alternative embodiment of the disclosure, the second partial interstice is generated between the component and the membrane, which is disposed spaced apart at the supporting member, preferably by means of a first sealing member. The sealing member circumferentially seals the first partial interstice and is located between the supporting member and the membrane. The membrane meanwhile spans part of the supporting member and, in this area, is in any case spaced apart from the supporting member by means of the sealing member, such that by generating a vacuum pressure between the supporting member and the membrane (i.e. in the first partial interstice) the membrane may move towards the supporting element, this creating a first vacuum pressure between the membrane and the component (i.e. in the second partial interstice), wherein the component also sealingly abuts the membrane in the area of the first sealing member.

According to a second alternative embodiment of the disclosure, the first partial interstice and the second partial interstice ate in air communication, i.e. the first interstice is a space connected in air communication, so that the vacuum pressure generated in the first partial interstice i.e. the vacuum pressure between the supporting member and the membrane, translates into the second partial interstice, thus directly acting onto the component. In this second alternative embodiment, the first sealing members may be omitted, which are present in the first alternative embodiment, since in this case, the membrane itself directly becomes disposed between the supporting member and the component, thus circumferentially sealing the first interstice between the component and the supporting member. In the first interstice itself, the membrane preferably is supplied with a perforation, holes or openings, so that the vacuum pressure directly acts on the component, pressing it against the supporting member. Air from the exterior may not enter, since the membrane itself seals the vacuum in the first interstice between the supporting member and the component.

In order for the membrane to also seal the component against the supporting member without an additional first sealing member, it is provided that the membrane will be biased or will be tensioned by introduction of the supporting element into a circumferential frame, in which the membrane is inserted, so that effective sealing of the vacuum in the interstice between the component and the supporting member will be effected by way of circumferential sealing effect of the membrane at the edges between the supporting member and the component.

In the first alternative embodiment of the disclosure, the manipulator may have multiple areas at the supporting member that are confined by first sealing members or sealing lips, said areas each are coated by a membrane, so that several retention areas will arise that are dissipated across the manipulator or the supporting member, respectively, with the help of which the component may be attached by suction at several positions and thus may be lifted up. In this case, each one of the individual areas of the supporting surface is individually and circumferentially sealed by first sealing members or area sealing lips, so that any vacuum pressure between the membrane and the respective area of the supporting element that adjusts in particular by way of a vacuum pump and that may be generated for example by way of first through channels arranged in the supporting member, displaces the membrane towards the supporting element, thus creating an appropriate vacuum pressure in the first interstice between the membrane and the component, since this first interstice is sealed via the first sealing members.

Alternatively, the supporting member may also comprise areas on the supporting member surface facing the membrane, and in particular may comprise an air outlet structure, that is configured such that they air-tightly close exclusively by way of the membrane upon abutting onto the component, for example by small protrusions or rims at the edges of this areas or by a thick flexible membrane. In particular preferably, the supporting member comprises a replaceable air passage structure, i.e. a replaceable supporting member surface, so that depending on the component to be lifted up, the air passage structure may be used with or without sealing members or sealing lips adapted to the component. Advantageously, sealing members as well as appropriate guiding and fastening members are present between the supporting member surface facing the membrane and the removable air passage structure for safely guiding and fastening the replaceable air passage structure.

2. Displacing the manipulator including the component towards the construction part.

By aspirating the component by way of vacuum pressure into the at least one first interstice the component may be lifted off the stack and may be moved towards the construction part by way of the manipulator.

3. Disposing the component on at least one partial surface of the construction part by way of the manipulator, wherein, during disposing, a second vacuum pressure generated in a second interstice between the supporting member and the construction part.

As soon as the component reaches the construction part, the manipulator is pressed against the construction part via the second sealing member, thus creating a second interstice between the construction part, the frame of the manipulator and the membrane, which is biasedly disposed on top of the supporting member and is biased towards the supporting element by means of the first vacuum pressure, so that the component is still kept attached to the supporting member by suction. The component to be applied may previously be provided with an adhesive at the side of the construction part for adhesively attaching the component to the construction part. Application of adhesive may either be done by peeling off a protective foil at the component part side of the component, so that an adhesive layer becomes exposed, which is disposed on top of the component, or by applying a separate adhesive layer, for example by previously moving the manipulator over a roll provided with adhesive, thus appropriately conferring an adhesive layer to the component part side of the component.

Once the second interstice is established by means of the second sealing members, which in particular become arranged between the frame of the manipulator and the construction part, a second vacuum pressure will be generated by withdrawing the air from the second interstice. This, for example, may be done by second through channels in the frame, which in turn are connected to a vacuum pump or a venturi nozzle. By creating a second vacuum pressure in the second interstice, the membrane, together with the component, is again pulled towards the construction part, i.e. opposite to the direction towards the supporting member, and the membrane with the component is removed from the supporting member in the direction towards the construction part. Once the component is at least partially fixed at the construction part, for example by adhering for the first time, preferably in the center, the second vacuum pressure is further increased and/or the first vacuum pressure is reduced. Eventually, the second vacuum pressure removes the membrane from being sealingly attached to the supporting member or the air passage structure or the sealing members thereto attached, respectively, if the force thereof acting onto the membrane is larger than that of the first vacuum pressure, so that the first vacuum pressure is omitted.

In particular, to avoid any unintended falling off of the components from said safe adherence to the construction part or to avoid unwanted forces acting on the supporting member via the second vacuum pressure, is provided, according to another embodiment of the disclosure, that the supporting member spring-mounted in relation to the frame, so that the supporting member may perform relative movement in the frame in a direction essentially perpendicular to the construction part. The spring force advantageously is weaker than the force of the first vacuum pressure, so that any falling off of the component is avoided, if the second vacuum pressure becomes larger than the first vacuum pressure and the component does not yet safely adhere to the construction part.

4. Mounting the component to the construction part by increasing the difference between the first and second vacuum pressures.

According to one embodiment of the disclosure, the manipulator continuously maintains the first vacuum pressure after arrangement and at least partial attachment of the component to the construction part is completed. The component is retained in position by the membrane, until it successively sticks to or adheres to or is mounted to the construction part by the second vacuum pressure, preferably from the center of the component towards the edge. This transition is preferably promoted by a supporting member that is spring-mounted in relation to the frame.

The first vacuum pressure may completely be stopped following first partial attachment of the component or may even promote the second vacuum pressure by means of excess pressure, wherein the second vacuum pressure preferably withdraws the air from the second interstice, thereby reducing the possibility of air pockets between the component and the construction part.

Thus, according to the present disclosure, a component to be applied is initially aspirated by way of the manipulator, to which advantageously a vacuum pump is connected. Subsequently, the manipulator is displaced, with the component being aspirated, towards the construction part, onto which the aspirated component is to be applied. The component to be applied is disposed at least at one partial surface of the construction part by way of the manipulator, and in particular is evenly applied by suction above a surface, wherein, the manipulator at least maintains suction of the component to be applied until the component adheres to the construction part for the first time. Before and/or during disposing, a vacuum pressure is preferably generated, in particular by withdrawing air by suction, in the second interstice between the construction part and the manipulator. In this interstice, the component to be applied is located.

Subsequently, the component is released from the manipulator by, at least intermediately, interrupting suction by the manipulator, by reduction or shutting down the first vacuum pressure. Preferably, the manipulator comprises a suction surface, in particular a supporting member formed as a support plate, by means of which the component to be applied is being aspirated, wherein the suction surface of the supporting element preferably is configured to be smaller than a suction surface of the component to be aspirated.

In the proposed method, a component to be applied may first advantageously be aspirated by way of the manipulator from a stack, on which a plurality of components to be applied are disposed on top of each other. By aspirating a component to be applied as such from a stack, the component to be aspirated is safely and gently picked by the manipulator. By aspirating by way of a vacuum pump, which is connected to the manipulator, the component to be applied may non-destructively be taken from the stack. For this, the manipulator may first gently press the component against the stack for generating the first vacuum pressure, so that a first sealing member, which is located between a supporting member of the manipulator and the component, or the membrane itself, if no first sealing members but e.g. a perforated membrane is used, sealingly locks.

Following the removal of a component to be applied, the manipulator may flexibly position the aspirated component to be applied to a construction part. Following disposing or positioning, respectively, of the component to be applied and in particular following first fixation or adherence of the component to the construction part, respectively, with the aid of decreasing first vacuum pressure between the manipulator and the construction part, the component to be applied may be fitted closely or may be adhered to the construction part, respectively, and may then be released. The second vacuum pressure maintains the component in position even with first vacuum pressure decreasing or being omitted.

Preferably, the first vacuum pressure generated for aspirating the component to be applied will be successively be reduced following arrangement and first fixation of the component to be applied on the construction part, until normal environmental pressure has been reached. It may furthermore be provided, for the vacuum pressure generated for suction will be transferred into a higher pressure in relation to the environmental pressure (excess pressure), thereby enabling the component to be applied to be molded to a construction part that is provided with a three dimensional structure or is bent or curved. Alternatively or in addition, a spring-mounted supporting member may be used, so that displacement of the component towards the construction part, while the second vacuum pressure is being started, is assured, even if the first vacuum pressure, in particular for securing the component, is not yet diminished or is disconnected.

Depending on the component to be applied, the first and second vacuum pressures, or excess pressure, respectively, in the first interstice may be controlled such that the component is successively adhered from the center part of the component towards an exterior part of the construction part, so that no or only very little air entrapments between the component and the construction part will remain. However, what is crucial is the fact that at the edge of the component full-area bonding to the construction part is done, i.e. that no fluids, air, gases or other material will enter in between the component and the construction part, which advantageous in subsequent lacquer bath or the like since the component then safely adheres to the construction part or cannot fall off any more, respectively.

By the reduction of the first vacuum pressure or reconstitution of a normal environmental pressure, or an excess pressure, respectively, in relation to the normal environmental pressure in the first interstice or by generation of the second vacuum pressure in the second interstice, respectively, the component to be applied may non-destructively be disposed on the construction part. Advantageously, the pressures evenly act upon a partial surface of the construction part, which is covered by the manipulator. Advantageously, by way of virtually automatic arrangement, in particular pressing the component to the construction part, an excessive, in particular local contact pressure or a uneven contact pressure may be avoided. In this way, risk of deformation of the construction part will be reduced. Moreover, by generating the second vacuum pressure, entrapment of air between the component and the construction will be reduced, and eventually will be avoided.

Actually, by construction part in particular a metal sheet or a body part of a vehicle is to be understood. For example, the component to be applied could be an in particular self-adhesive combination, which could be employed as earls as in the body-shell on lubricated surfaces. Furthermore, with the proposed method, a component could be applied to a construction part, which, for example, is used in the field of aerospace technology, electronics of appliances or in other production methods, in which manipulators are employed. It is furthermore conceivable, that the component to be applied comprises another self-adhesive material combination or non-adhesive material combinations, or, for example, may also be made use of in building construction, e.g. for mounting window planes, façade elements or the like.

According to another embodiment of the disclosure, the first vacuum pressure in the second partial interstice is generated by way of a membrane, which is sealingly disposed between the component and the supporting and which, at the side facing the supporting member, is in air communication with a vacuum pump. According to one embodiment of the disclosure, solely the air-permeable membrane provides sealing operation between the supporting member and the component, so that additional sealing members or sealing lips may be omitted.

The manipulator according to the disclosure advantageously comprises a supporting member that, at one or more locations, comprises appropriate first partial interstices confined by means of first sealing members that are in <c with through channels that are in air communication with a vacuum pump. Advantageously, the supporting member, at the side associated to the membrane, comprises air outlet structures, such as for example grids, through which the air from the first partial interstice between the membrane and the supporting member may be withdrawn, thereby displacing the membrane in the direction towards the supporting element and generating a first vacuum pressure between the membrane and the component to be aspirated. In the case of equilibrium, the vacuum pressure between the supporting member and the membrane is as large as between the membrane and the component, i.e. there is a first distance between the supporting member and the component, said distance being generated the first sealing member. The membrane may displace within this distance; the membrane being flexible and elastic and complying with a vacuum pressure between the membrane and the supporting member, so that the first vacuum pressure adjusts between the membrane and the component. By way of the air passage structure it will be avoided, that upon abutting the membrane to the supporting member, the through-channel will be locked and no more air will be removed.

According to a second preferred embodiment of the disclosure, the manipulator according to the disclosure comprises a supporting member das displaceable and eventually spring-mounted in a frame, such that a membrane between the supporting member and the component to be aspirated is disposed and is biased such that circumferential and sealing abutment of the supporting element to the component to be aspirated results upon application or abutting of the supporting element to the component, respectively, results, wherein the above-mentioned first partial interstice between the supporting member and the membrane also is in air communication with the through-channels that are in air communication with a vacuum pump. Herein, the supporting member may also comprise air outlet structures at the side associated to the membrane, such as for example grids. Through the air communication between the first partial interstice and the second partial interstice, a vacuum pressure is generated directly between the component and the supporting member. Under this vacuum pressure, the membrane in particular provided with openings or holes abuts the air passage structure or sealing members thereto arranged, the membrane in this area being air-permeably configured. In this case, the membrane between the supporting member and the component is for sealing the supporting element towards the membrane and—following application of the component to the construction part—for sealingly disposing the manipulator frame at the construction part and thus for generating the second vacuum pressure.

The advantage of the second preferred embodiment of the disclosure resides in that first sealing members may be omitted, and that failure in manipulating the component, i.e. for example falling off of the component may immediately be detected by a drop of the vacuum pressure, which is not the case with the first preferred embodiment, since the vacuum pressure essentially forms in the first partial interstice between the supporting member and the membrane and falling off of the component may not readily be detected by measuring the then lacking vacuum pressure.

According to another embodiment of the disclosure, the second vacuum pressure in the second interstice is generated by means of a frame of the manipulator sealingly disposed at the construction part, wherein the second interstice is in air communication with the vacuum pump.

The second interstice, which arises between the frame, the construction part and the membrane following disposing the manipulator at the construction part, is in particular generated by the second through-channels, connecting said second interstice to the vacuum pump or a separate vacuum pump.

According to another embodiment of the disclosure, the second interstice is confined by the frame, the construction part and the membrane, and the component, following arrangement, will be received in the second interstice.

By receiving the component in the second interstice, said component will be displaced upon generating the second vacuum pressure with the aid of the membrane in the direction towards the construction part, wherein the second vacuum pressure counteracts the first vacuum pressure or the first vacuum pressure may be disconnected following first adherence, respectively, so that the second vacuum pressure is sufficient, in order to fully adhere the component to the construction part.

According to another embodiment of the disclosure, the supporting member comprise at least one through-channel that is in air communication with the vacuum pump and at least one air passage structure facing the membrane, wherein the membrane is being sealingly spaced apart via at least one first sealing member in relation to the supporting member, at least in the area of the at least one air passage structure, wherein air between the membrane and the supporting member is removed, so that the membrane displaces towards the supporting member, so that a vacuum pressure results in the first interstice.

According to another embodiment of the disclosure, the component has a suction side auf, via which the component is fully aspirated by the manipulator, and an opposite, in particular adhesive component part side, through which the component is disposed at the construction part, and is in particular pressed and adhered thereto.

Said suction side preferably is configured such that an air-tight connection between the suction side of the component and the membrane results, abutting the first sealing member and, to this extend, is clamped, for example, by a resilient sealing member between the sealing member and the component and, to this extend, is sealingly mounted. Since, in this case, the membrane biases across the interstice between the supporting member and the component, it is required to be configured in a flexible, i.e. elastic manner, to assure deflection in the direction towards the supporting element and to be able to generate the first vacuum pressure.

According to another embodiment of the disclosure, the at least one air passage structure (30) is mounted or is molded or is replaceably disposed on the exterior side of the supporting element (11) facing the membrane (26).

According to another embodiment of the disclosure, the second vacuum pressure is generated by means of disposing the component at the construction part by means of at least one second sealing member that is located between the frame of the manipulator and the construction part, so that the second interstice arises. Mounting the component to the construction part is done in a first step by reducing the first and/or increasing the second vacuum pressure, so that the component at least partially adheres to the construction part and, in a second step, by further reducing the first and/or increasing the second vacuum pressure and/or disconnecting the first vacuum pressure.

According to another embodiment of the disclosure, the first sealing member eventually is in particular replaceably and advantageously circumferentially arranged together with the at least one air passage structure at the supporting member.

According to the first preferred embodiment of the disclosure, the supporting member may comprise multiple areas that are surroundingly or circumferentially provided with first sealing members, across which a single or a common membrane may be biased. Preferably, the membrane is biased across the complete supporting member, whereas the supporting member comprises one or more areas having first circumferential sealing members that each surround air outlet structures, such as e.g. openings or grids, disposed at the supporting member. The membrane preferably is sealingly mounted by means of a mounting member at the frame and is biased across the first sealing members via the supporting member centrally spaced apart in the frame. The supporting member can preferably comprise replaceable air outlet structures, that are eventually circumferentially provided with first sealing members, so that the very same supporting member may be utilized with eventually multiple through-channels and air outlet structures for multiple aspiration areas.

In particular in case of omitting the first sealing members, biasing the membrane in particular may be accomplished by the supporting member to be immersed in the frame of the manipulator by a specified penetration depth, so that the membrane that is maintained, or biased in appropriate beadings of the frame, and thus sealingly becomes arranged between the supporting member and the component.

According to another embodiment of the disclosure, the first vacuum pressure is generated by way of a first vacuum pump, and the second vacuum pressure is generated by way of a second vacuum pump, and/or the first interstice is connected via the membrane and a pressure controller or a pressure reducer, respectively, and/or the second interstice is connected via a pressure controller with a vacuum pump, such that the first and second vacuum pressures may be increased or reduced continuously or stepwise and advantageously independently from each other.

According to another embodiment of the disclosure, the frame and the supporting member are spaced apart from or to each other, respectively, that contacting by the frame of an aspirated component is suppressed.

Between the supporting member and the frame, a second distance preferably is provided that prevents passing through the membrane and contacting the component with the frame. It simultaneously is advantageous for the supporting member to be dimensioned slightly smaller than the component within its extension plane to assure safe joining to the construction part. By extension plane, according to the disclosure, essentially the two-dimensional extension of the supporting element is meant, since in particular a planar component is to be mounted to the construction part, i.e. the width and/or the length of the supporting element should be equally large or should be smaller than the appropriate width or length of the component, respectively.

According to another embodiment of the disclosure, the component part side of the component is formed with an adhesive layer, which, during mounting the component to the construction part, is connected to the construction part.

According to another embodiment of the disclosure, mounting the component to the construction part is done starting from an suction position, which essentially is centrally at the component, to an edge of the component by increasing the difference between the first and second vacuum pressures, such that the component at least circumferentially becomes disposed without air entrapments at the construction part.

The device according to the disclosure comprises a manipulator for evenly pressing a component in particular to a surface of a construction part, wherein the manipulator receives the component to be applied by means of a first vacuum pressure that is generated in a first interstice between a supporting member and the component, the manipulator displaces the component to be applied to the construction part, the manipulator disposes the component at least one partial surface of the construction part, wherein, during disposing, a second vacuum pressure is generated in a second interstice between the supporting member and the construction part, and wherein the manipulator, in particular adhesively, attaches the component to the construction part, for example, by increasing the difference between the second and first vacuum pressure.

According to a preferred embodiment, a through-channel extends through the supporting member, the through-channel preferably being orthogonal to a suction surface of the supporting element, and preferably essentially centrally arranged, in which through-channel an air stream flows that is generated by the vacuum pump for aspirating the component By disposing a through-channel in a central position passing through the supporting member, it is possible for the component to be aspirated initially convexly abutting the manipulator in relation to the supporting member. By decreasing the pressure between the supporting member and the aspirated component (i.e. by generating the first vacuum pressure, in particular by the vacuum pump), the component to be applied may initially cling to the manipulator. Furthermore, the component may be aspirated through the essentially centrally arranged through-channel essentially at the point of gravity thereof. By aspirating the point of gravity of the component to be applied, the component to be applied may safely be retained by the manipulator.

The component to be applied comprises a suction side, via which the component is fully aspirated by the manipulator, and an opposite component part side, with which the component is adapted, and in particular is forced to the construction part. Following arrangement at the construction part, the suction side of the component is the side at the construction part that is freely accessible. By aspirating the component based on air pressure differences, the component to be applied may non-destructively be disposed to the construction part, in particular the force exerted to the component and the construction part acts in a planar manner.

Preferably, the manipulator is formed with a replaceable supporting member for aspirating the component, which preferably is formed at least partially complementary to a construction part surface, to which the component is to be applied. The use of a performed replaceable supporting element that in particular is preformed complementary to the construction part, allows that the component to be applied is preformed even prior to arranging at the construction part, in particular to be bent or to be embossed. In this way, arranging the component to be applied at the construction part may be done in in time-saving manner. Advantageously, the component to be applied is resiliently or partially elastically deformable.

During aspiration, the first sealing member—in the first preferred embodiment of the disclosure—allows a continuous air stream along the supporting member or along the supporting member surface, respectively. By the first sealing member a distance between the membrane and the supporting member is generated, thus allowing displacement of the membrane and the component.

Preferably, the air passage structure is a rigid grid or is formed in the form of in particular evenly or unevenly distributed protrusions, grooves or trenches on the suction surface of the supporting element or the replaceable supporting member. In case of a deformable or elastically deformable air passage structure, said structure may for example be formed of metal or plastic or a spongy material. In case of protrusions, said protrusions may for example be formed of silicone or rubber or another deformable material, which is deformable based on a force impact, such as for example a vacuum pressure. Preferably, with the first sealing member a first distance of 0-10 mm, preferably 0.2-5 mm, in particular preferably 2-3 mm between the supporting member and the component is adjustable. By this distance, a continuous air stream between the membrane abutting the first sealing member, including the component to be applied and the supporting member or the supporting member surface, respectively, is allowed.

Preferably, the first distance between the supporting member and/or the supporting member surface and/or the component most closely abutting thereto is adjustable based on an at least partial elastic deformability of the first sealing member. Adjustment of the first distance is done by the vacuum pressure, which is generated by the vacuum pump. In combination with the partial elastic deformability of the first sealing member, the first distance may be adjusted by adjusting the desired vacuum pressure. Furthermore, the distance may further be reduced by further reducing the vacuum pressure or may be increased by increasing the pressure, respectively. This has the advantage that the first distance is at least partially adjustable by the suction force, which retains the component to be applied. It is thereby enabled to apply different components to be applied having different deformability or different resiliency to a construction part.

According to a preferred embodiment of the method, reduction of the first vacuum pressure, i.e. aspiration, is done continuously, wherein the vacuum pump continuously or stepwise adapts the first vacuum pressure required by the manipulator for aspirating to a normal environmental pressure. In this way, the manipulator releases the component that has been arranged and fixed to the construction part. Furthermore, the component to be applied may gently be clung to the construction part. In the case that the component to be applied is not or is not safely mounted to the construction part or if the method of applying is to be stopped, a new first vacuum pressure may be established to allow the component to be applied to be retained by the manipulator. In this case, for example another adhesive layer may be applied to the component to be applied. Subsequently, re-application of the component to be applied may be performed. Continuous or also stepwise reduction of aspiration allow for the component to be applied to be prevented from falling off from the construction part.

Preferably, the component to be applied is embossed prior to and/or following arrangement at the construction part. A three-dimensional structure may thereby be conferred to the component to be applied or the component that has been applied.

For mounting the component to be applied, the component part side of the component preferably is formed with an adhesive layer, which upon pressing the component to the construction part will be connected to the construction part. An adhesive layer may initially be applied by a machine, in that for example a roll applies adhesive to the component and in that the component is subsequently covered by a removable protective foil. It is conceivable that the component to be applied is a butyl combination, which, in automotive industry, may already be employed for the body shell onto lubricated metal sheets. It is furthermore conceivable that the component to be applied consists of another self-adhesive material combination or non-adhesive material combination.

Preferably, adhesion of the component to the construction part is done starting from a starting position, which essentially is located in the middle of the component, to an edge of the component by increasing the second vacuum pressure and/or by adapting the first vacuum pressure to the normal environmental pressure or by, in particular short-time, exceeding the normal environmental pressure. Preferably, the supporting member is resiliently mounted in the frame, to thereby be able of being moved towards the construction part, by way of following the second vacuum pressure. In that the membrane is biased across the first sealing member and hence has the lowest resistance, in relation to the second vacuum pressure, in the center above the first sealing member, the membrane generally is always concavely curved, i.e. towards the construction part.

According to an embodiment of the disclosure, the through-channel for the vacuum pump or the air passage structure, respectively, may preferably be centrally arranged to the supporting member and/or may extend therethrough, so that the suction force, which is applied to the component to be applied, is maximal at that position. It is thereby achieved that the component to be applied is convexly formed in relation to the supporting member surface and/or in relation to the supporting member and, during further aspiration of the component to be applied, clings to the form of the supporting member surface and/or the supporting member. It may, for example be concavely formed. In relation to a construction part surface, the component to be applied, in this state, is as well concavely formed. In the subsequent arrangement of the component at the construction part, the component to be applied continuously releases from the supporting member surface and/or the receiving member, so that upon pressing the component to the construction part, the component at least in part is concavely formed in relation to and clings to the construction part surface. This means that the component, starting from a central point of the component, clings to the construction part and clings to the construction part up to the edges thereof by adapting the reduced pressures. Undesired air entrapments between the component and the construction part may thereby be avoided.

Advantageously, a robot, which is formed with a described manipulator, according to a working example of the described method, may operate partially automated or even fully automated. In cooperation with a user, the work to be done may flexibly be divided among the user and a collaborative robot, which collectively results in lower-cost production capabilities.

Further advantages and characteristics of the present disclosure will arise from the following description of preferred embodiments by making reference to the accompanying figures. It is to be understood that individual embodiments shown in the respective figures may have characteristics that may as well be utilized in other embodiments, even if they will not be explicitly mentioned, and in as far this has not been excluded due to technical conditions or has explicitly been excluded.

DETAILED DESCRIPTION

Referring now to the FIGS. 1 to 5, the present disclosure will be described by way of preferred working examples of the method for applying, in particular for pressing, a component onto a construction part by way of a manipulator.

Figure 1:
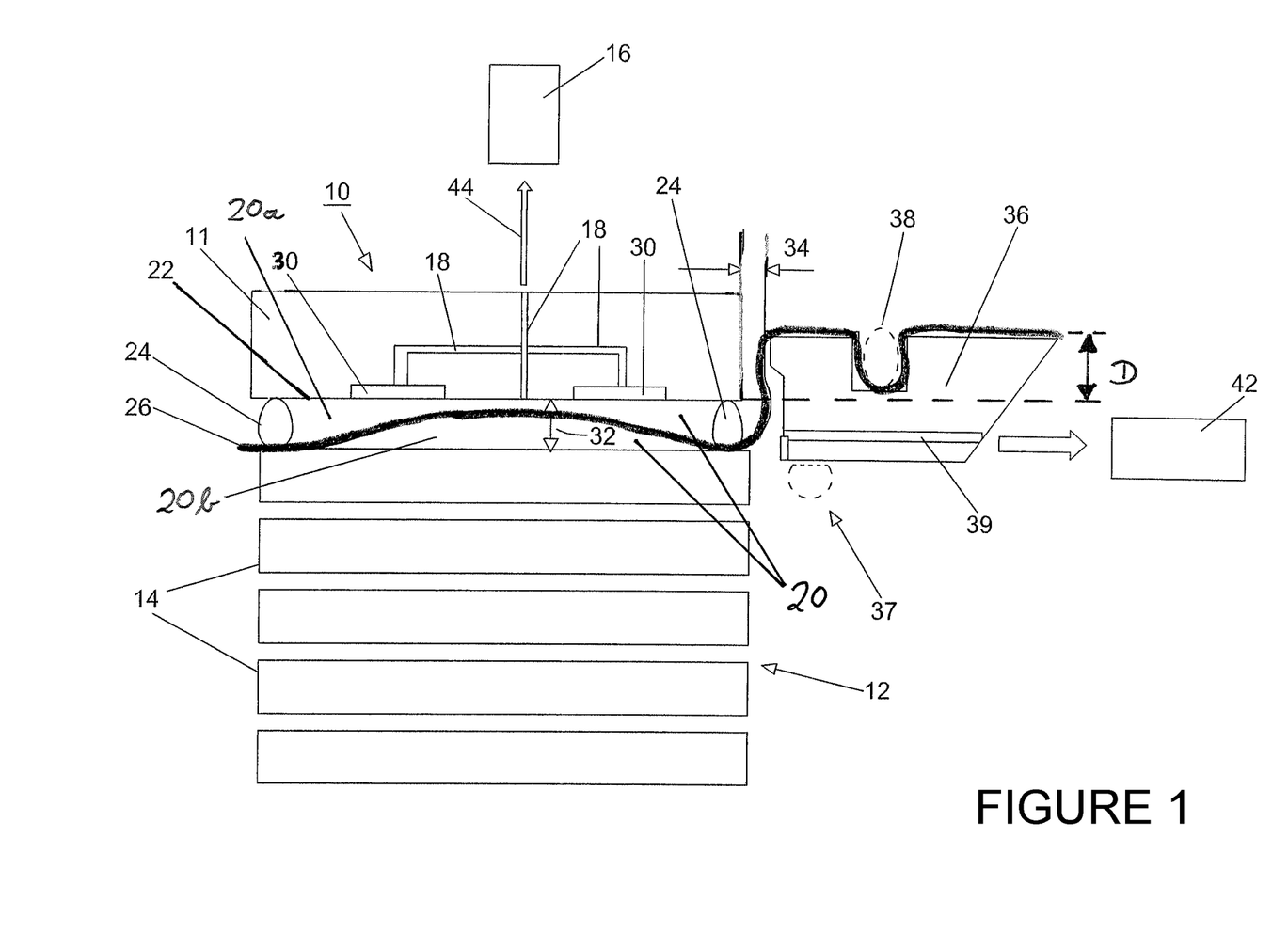
FIG. 1 schematically shows aspiration a component to be applied from a stack by a manipulator.

FIG. 1 shows, in a first method step, the manipulator 10 removing a component to be applied 14 from a stack 12 by aspirating the component to be applied 14 by the manipulator 10. The manipulator 10 is connected to a first vacuum pump 16. The manipulator 10 furthermore comprises a supporting member 11 formed as a support plate that comprises at least one through-channel 18, which is in communication with the first vacuum pump 16. Air, which is present between a membrane 26 and the supporting member 11, is withdrawn through the through-channel 18, so that the membrane 26 extends or displaces in the direction towards the supporting element, respectively, as shown in FIG. 1.

Displacement or extension of the membrane 26, respectively, in the direction towards the supporting element 11 is done by sealingly abutting the supporting element 11 to the component 14, wherein, between the supporting member 11 and the component 14, a first sealing member 24 is arranged, that furthermore maintains the membrane 26 spaced apart from the supporting member 11, such that it initially abuts the component 14. By activating the vacuum pump 16 the air is preferably withdrawn via one or more air outlet structures 30, which are disposed on the supporting member surface 22 or adjacent thereto, so that the membrane 26 expands within the first distance 32 between the supporting member 11 and the component 14, thus achieving a vacuum pressure in a first partial interstice 20a formed therein and subsequently aspiration of the component. The vacuum pressure formed in the first partial interstice 20a in turn causes another vacuum pressure in a second partial interstice 20b that forms between the membrane 26 and the component 14. Said second partial interstice 20b is laterally sealed by the membrane that is present between the supporting member 11 and the component 14, or optionally, is sealed by additional sealing members 24 between the membrane 26 and the supporting member 11.

The first distance 32 is selected such that the membrane sufficiently displaces from the suction surface of the component 14 and may generate an appropriate first vacuum pressure thereon. Simultaneously, it is to be avoided that the membrane 26 fully abuts the supporting member surface 22 of the supporting member 11 and the first vacuum pressure is not sufficient for safely lifting the component 14.

The membrane 26 preferably is clamped in a frame 36 and therein is sealingly mounted by means of fastening members 38. Preferably, a beading is used herein, which is circumferentially mounted at the frame 36 in a groove or in a rail. The frame 36 comprises second through-channels 39 by means of which (cf. FIG. 2) a second air stream 48 may be guided to a vacuum pump 42, to generate a second vacuum pressure in a second interstice 46.

The first sealing members 24 may be omitted (cf. also FIG. 3), as soon as the supporting member 11 is sufficiently deep inserted into the frame 36, i.e. a penetration depth D of for example ≥1 mm is achieved, preferably ≥5 mm, in particular preferably ≥10 mm. Biasing of the membrane 26 results that sealingly surrounds the air passage structure (30), thus causing sealingly abutting of the supporting element 11 at the component 14, even without the first sealing members 24. In this case, the membrane 26 is pierced, semipermeable or perforated (not shown), so that the vacuum pressure developing in the first partial interstice 20a, also immediately develops in the second partial interstice 20b, thus resulting in aspirating the component 14 at the supporting member 11.

Figure 2:
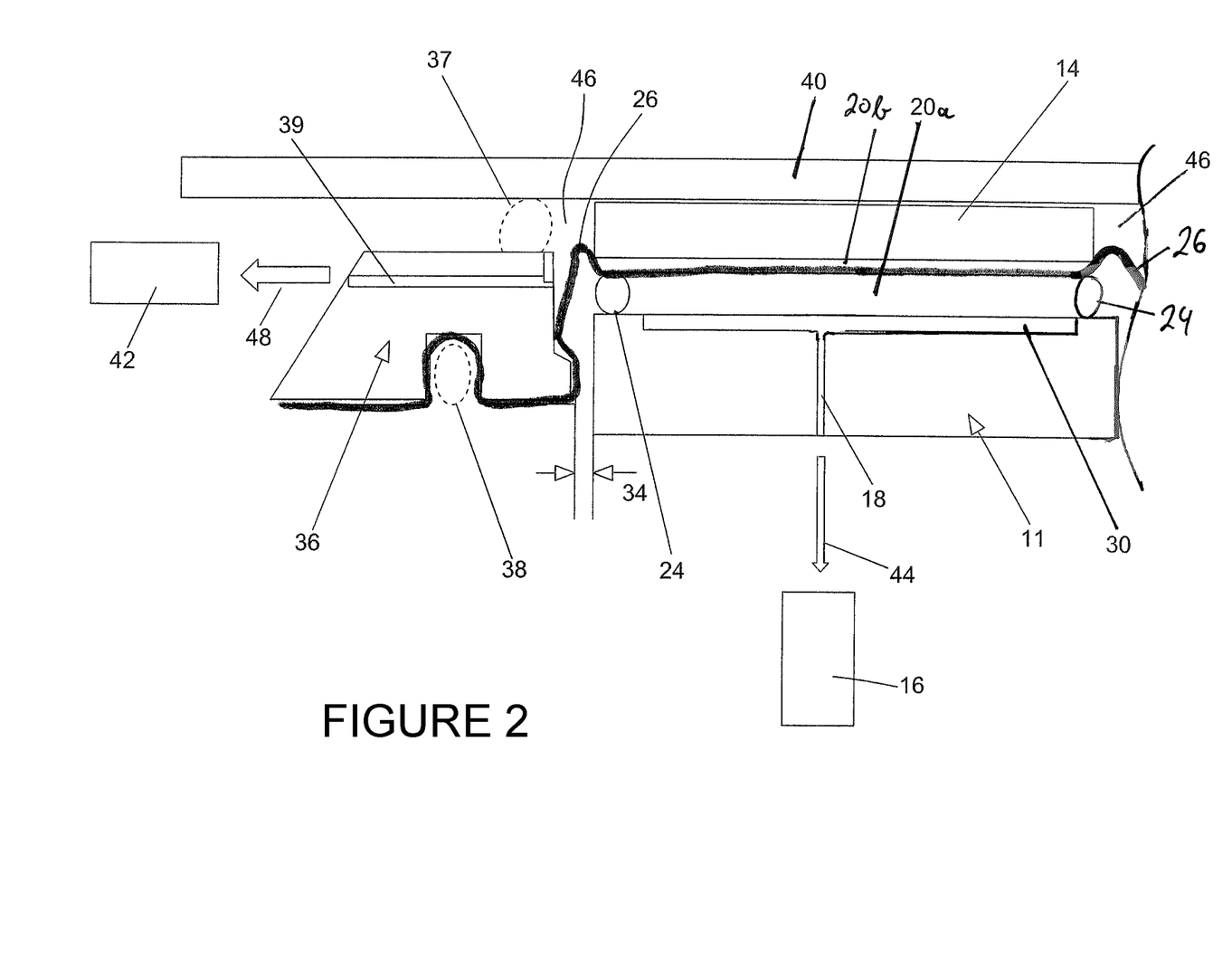
FIG. 2 shows application of a component to a construction part by way of a manipulator.

As it is shown in FIG. 2, the component 14 is disposed to a construction part 40 by way of the manipulator 10, wherein the frame 36 bears second sealing members 37 that sealingly close the frame 36 in relation to the construction part 40. In this way, a second interstice 46 establishes between the frame 36, the construction part 40 and the supporting member 11 of the membrane 26, respectively, the membrane being clamped in the frame 36 and eventually being clamped via first sealing members 24 across the supporting member 11, thus retaining the component 14 by suction.

As soon as the component 14 is fixed at the construction part 40, and for example abuts while partially adhering, the first air stream 44 may be reduced or may even be interrupted, whereas, prior to fixing and/or adhering, the second air stream 48 provides for vacuum pressure in the second interstice 46, to reduce or even completely avoid any air entrapments between the component 14 and the construction part 40. By further reducing or interrupting the first vacuum pressure and increasing the second vacuum pressure in the second interstice 46 the component 14 may then be fully adhered to the construction part 40, and in particular may be adhered thereto, causing any air pockets.

FIG. 2 shows the mounted state, wherein the membrane 26 again abuts the component 14 with the component 14 being spaced apart from the supporting member 11 and will be drawn in the direction towards the construction part 40 by the second vacuum pressure in the second interstice 46. Advantageously, a second distance 34 is provided between the supporting member 11 and the frame 36 of the manipulator 10, which avoids displacement of the supporting element 11 and collision with the frame 36. Simultaneously, the component 14 is equally large as or is smaller than the supporting member 11, thus avoiding abutting of the membrane 26 while generating the second vacuum pressure in the second interstice 46 and assuring safe discharge of the air by means of the second air stream 48 towards the second vacuum pump 42.

Figure 3:
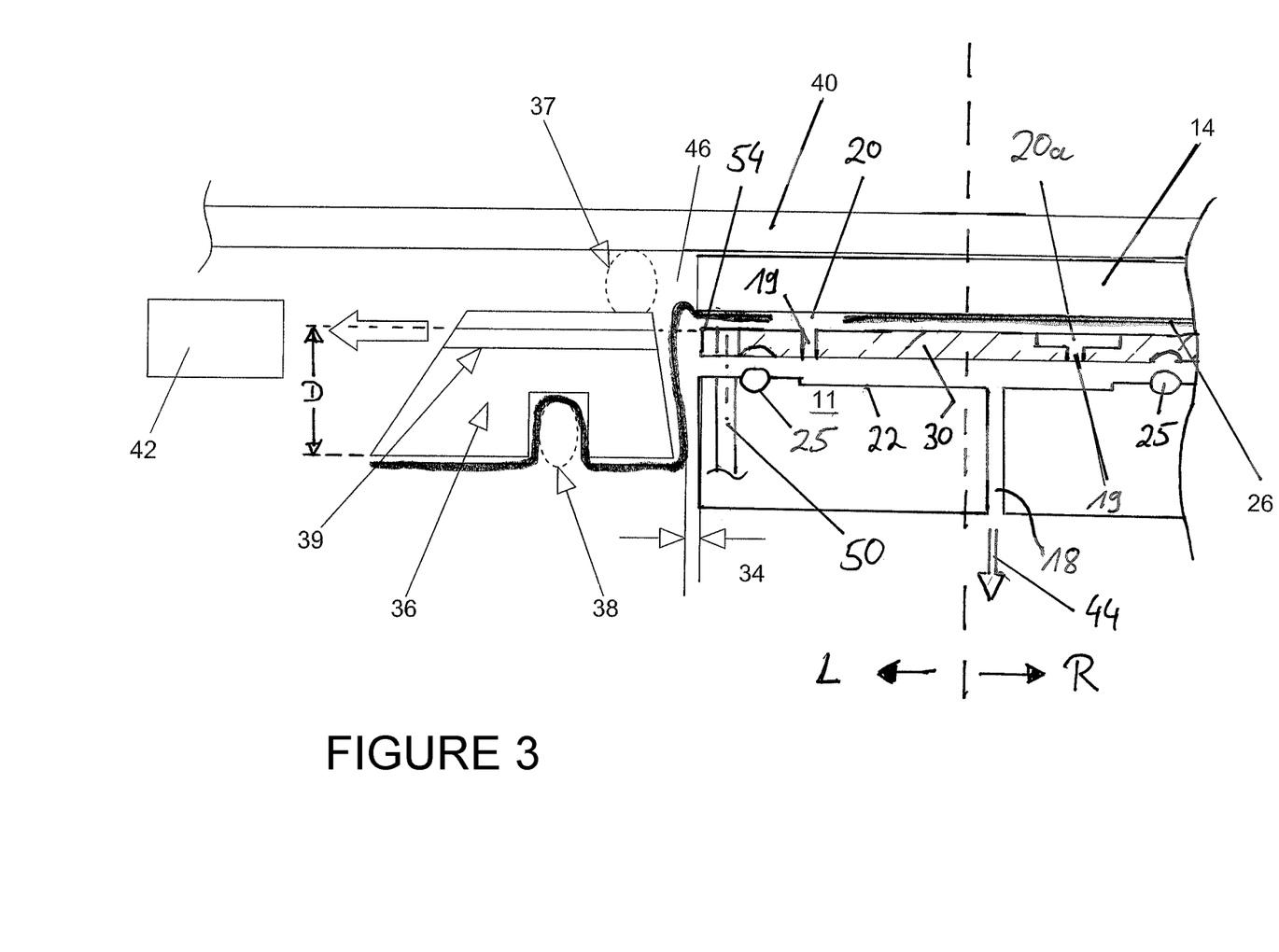
FIG. 3 shows application of a component to a construction part by way of a manipulator having alternative, removable supporting member surface.

FIG. 3 as well as FIG. 2 show adherence of the component 14 to the construction part 40, wherein the supporting member 11 herein is represented as having a removable air passage structure 30 (slightly lifted), which eventually is sealingly arranged at the supporting member surface 22 via a seal 25 towards the supporting member 11. The removable air passage structure 30 is arranged replaceably mounted at the supporting member 11 by way of guiding and fastening members (herein only schematically shown), such as e.g. pins, screws, spring locks or the like.

FIG. 3 shows two versions R, L of an air passage structure 30 having an appropriately suitable membrane 26 of a preferred embodiment of the disclosure. A first version R, shown to the right of a dashed separation line, and a second version L, shown to the left of the dashed separation line.

In the first version R, as represented to the right, the air passage structure 30 comprises channel segments 19 that are permeable in relation to the membrane 26, therein forming the first partial interstice 20a and discharging the air in the direction towards the vacuum pump 16. The membrane 26 seals the edges towards the replaceable air passage structure 30 and is attracted by the first vacuum pressure, so that another vacuum pressure is generated between the membrane 26 and the component 14.

In der second version L, as represented to the left, the air passage structure 30 comprises channel segments 19 that are permeable in relation to the membrane 26, therein forming the first partial interstice 20 and discharging the air in the direction towards the vacuum pump 16. In this second version, the membrane 26 is perforated, i.e. it comprises holes and seals towards the replaceable air passage structure 30 at the edges thereof. The component 14 is aspirated by the vacuum pressure generated in the first interstice 20 and adheres to the air passage structure 30. The membrane 26 seals the first interstice towards the exterior. The essential advantage of this second version is failure recognition. If the component 14 falls off, the vacuum pressure decline thus generated at the vacuum pump 16 or a pressure sensor (not shown) may immediately be detected and further movement of the manipulator may be stopped.

The air passage structure 30 is sealingly arranged at the supporting member surface 22 of the supporting element 11, a seal 25 is being represented at the ends of said air passage structure. The air passage structure 30 may replaceably be provided at the supporting member 11, to be able to realize different suction positions on the supporting member 11 or suction surfaces for different components 14, respectively. Herein, the membrane 26 is biased via a fastening member 38 herein formed as a beading and defined in a groove of the frame 36, thus may be biased across the air passage structure (30) at the supporting member 11. for this, the corners and edges 54 of the air passage structure 30 are preferably rounded to avoid damage of the biased membrane 26. However, it is also possible for the corners and edges 54 of the air passage structure 30 to be slightly lifted in the direction towards the component to be lifted, i.e. to be lifted facing away from the supporting member 11, or to provide protrusions or bulges therein, across which the membrane 26 sealingly abuts. The sealing members 24 shown in FIG. 2 are thus optional and may also be omitted, as it is shown in FIG. 3, if the membrane 26 is sufficiently biased and in this way also provides for the sealing effect between the supporting member and the component.

In all figures, essentially only one side of the manipulator 10 is shown, i.e. the frame 36 is arranged around the supporting member 11 in particular circumferentially, i.e. in particular circularly or rectangularly. In relation to the frame 36, the supporting member 11 is advantageously displaceably arranged in the direction towards the construction part 40, and consequently, in addition to the second vacuum pressure or independent thereof, may displace the component 14 in the direction towards the construction part 40, following arrangement of the frame 36 at the construction part 40, for example by being spring-mounted in the frame 36 or by being guidingly mounted in relation to a frame housing 56, respectively, in order to be able to perform relative movement of the supporting element 11 in the frame 36, essentially orthogonal to the construction part 40.

Figure 4:
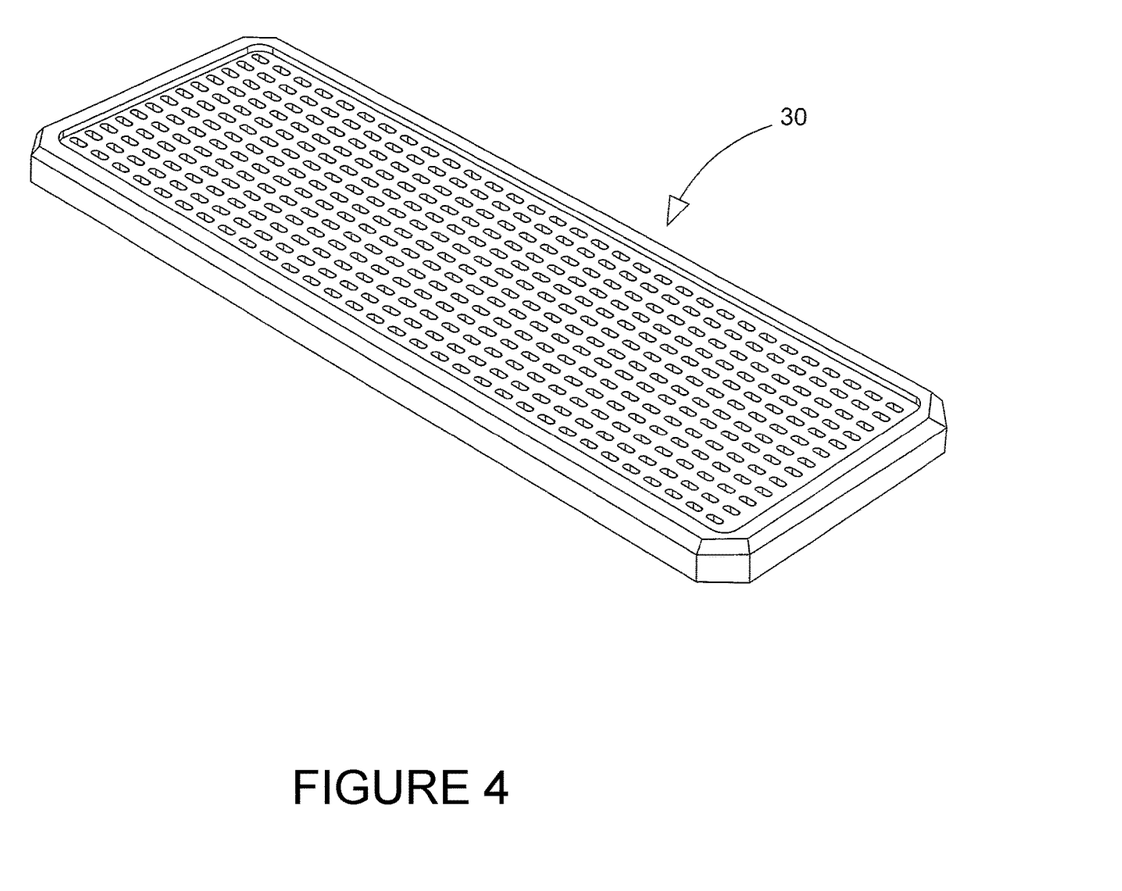
FIG. 4 shows an air passage structure according to the disclosure, which may be installed on top of the manipulator.

FIG. 4 shows an air passage structure 30. The air passage structure 30 may be attached to the supporting member surface 22. Preferably, the air passage structure 30 comprises a rigid, partially or totally resiliently deformable material, such as for example a metal grid structure, a rubber, a silicone, a resiliently deformable plastic material, a sponge structure, or the like. It is furthermore conceivable, that the air passage structure 30 is attached at a receiving element (not shown), which in turn is attached to the supporting member surface 22. Such a receiving element may, for example, have a predetermined three-dimensional structure, which in particular is complementary to the construction part 40. By mounting the air passage structure 30 and/or the first sealing member 24 to the receiving element, continuous air withdrawal is enabled upon applying a vacuum pressure, so that the component to be applied, with the interposed membrane, takes the form of the receiving element. In this way, even by using a preformed receiving element (not represented) it may be assured that an in particular regular distance between the receiving element and the aspirated component to be applied 14 is met, so that an air stream 44 during aspiration may be maintained.

Figure 5:
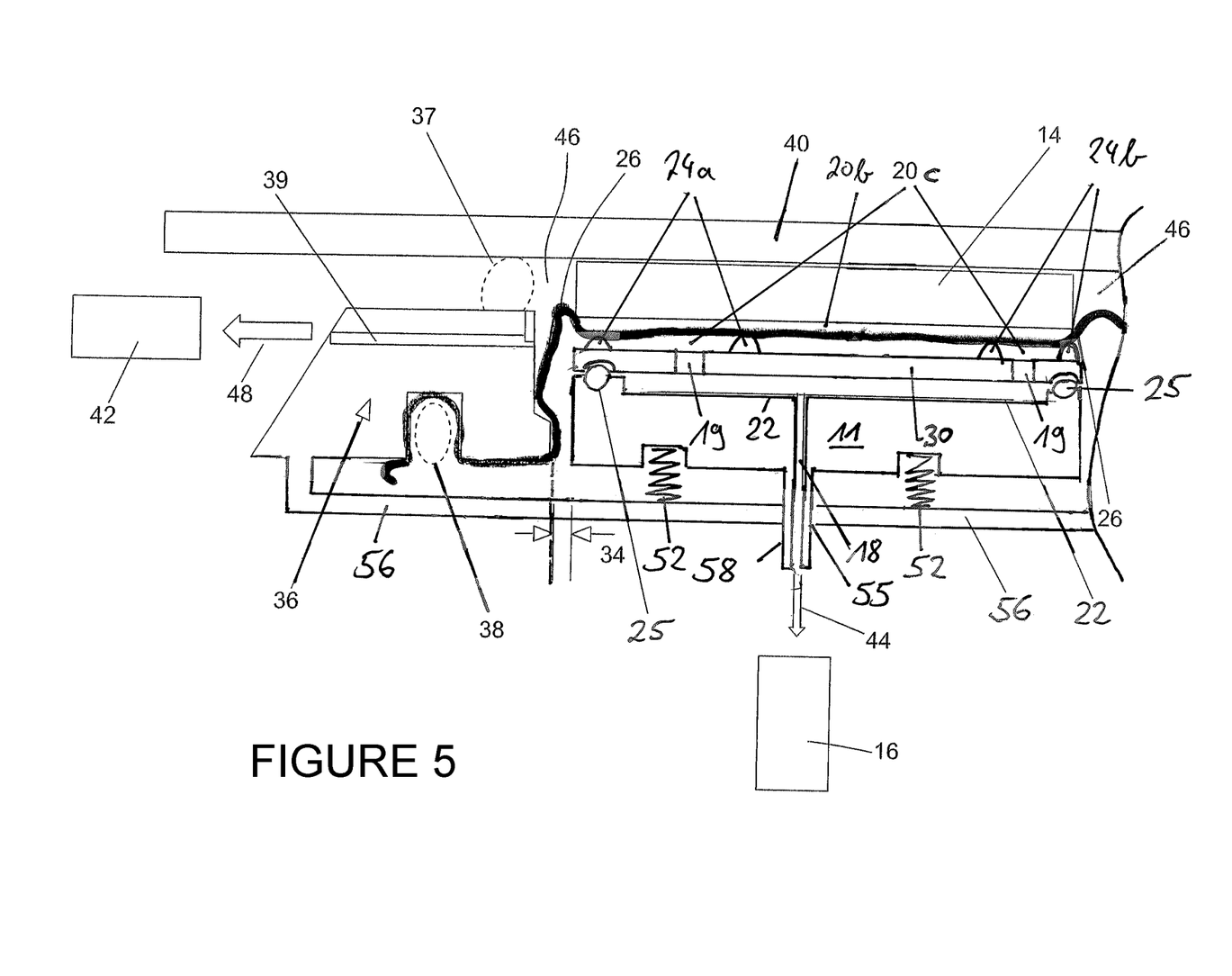
FIG. 5 shows application of a component to a construction part by way of a manipulator having alternative, removable supporting member surface on a spring-mounted supporting member and several vacuum chambers.

FIG. 5 shows another embodiment of the disclosure slightly modified in comparison to FIG. 3. Also herein, the supporting member 11 is represented with a removable air-passage structure 30 (in this case only one variant and in the assembled state) that, in relation to the supporting member 11, is also sealingly arranged at the supporting member surface 22 facing the membrane 26 by way of a seal 25. The removable air passage structure 30 is replaceably arranged at the supporting member 11 F guiding and fastening members (herein not represented, such as for example pins, screws, spring locks or the like or by means of the seal 25. The air passage structure 30 comprises channel segments 19, which herein, however, are in communication with vacuum pressure areas 20c forming different vacuum pressure areas or zones, respectively, by means of area sealing lips 24a, 24b between the supporting member 11 and the component 14. By way of said vacuum pressure zones, which are disposable on the supporting member surface 22 in any manner, different requirements may individually be taken into account in applying components 14, the weight thereof, fragility, etc. The membrane 26 extending across this vacuum pressure zone may both be air-permeable and air-tight, depending on the preferred mode of application.

Thus, the air is discharged from the vacuum pressure areas 20c by means of the channel segments 19 in the direction towards the vacuum pump 16. The membrane 26 seals the vacuum pressure areas 20c, which, in case of an air-permeable membrane 26, extend to the component 14, towards the component 14 by means of the area sealing lips 24a, 24b. At the supporting member surface 22 of the supporting element 11, the air passage structure 30 is sealingly disposed, at the ends of which in turn the seal 25 is represented. The air passage structure 30 may replaceably be provided at the supporting member 11 to be able to realize different vacuum pressure areas 20c on the supporting member 11 or to realize suction surfaces for different components 14, respectively.

Herein, the membrane 26 is again biased via a fastening member 38 formed as a beading and arranged in a groove of the frame 36 and may thus be biased across the air passage structure 30, in particular across the area sealing lips 24a, 24b at the air passage structure 30.

Moreover, FIG. 5 schematically shows springs 52, with the help of which the supporting member 11 is resiliently mounted in the frame 36. By means of one or more pins 58 attached to the supporting member 11, that are slidably mounted in one or more bearings 55 at or in a frame housing 56 schematically shown, the supporting member 11 is movably mounted in the frame 36. In the respective embodiment shown in FIG. 5 a centrally arranged pin 58 is shown, which, in a bearing 55 in the frame housing 56, simultaneously serves for receiving the first through-channel 18, so that the air may safely be discharged or withdrawn, even with a supporting member 11 moving in relation to the frame 36 or the frame housing 56, respectively. In this way, the supporting member 11 may resiliently slide essentially orthogonal to the construction part 40 in the frame 36. The second distance 34 between the supporting member 11 and the frame 36 avoids possible damage of the membrane 26 due to relative movement between the supporting member 11 and the frame 36.

The invention claimed is:

1. A method for applying a component to a construction part by way of a manipulator, the method comprising:
   receiving the component to be applied by a first vacuum pressure in a first interstice between a supporting member and the component,
   displacing the manipulator with the component towards the construction part,
   disposing the component at at least one partial surface of the construction part by way of the manipulator, wherein, during the disposing, a second vacuum pressure is generated in a second interstice between the supporting member and the construction part, and
   mounting the component onto the construction part via a membrane disposed between the component and the supporting member by increasing a difference between the first and second vacuum pressures.

2. The method according to claim 1, wherein the manipulator continuously maintains the first vacuum pressure until completion of the disposing of the component at the at least one partial surface of the construction part and until the component is at least partially mounted at the construction part.

3. The method according to claim 1, wherein:
   the first vacuum pressure in the first interstice is generated by way of the membrane, and
   the membrane is sealingly arranged between the component and the supporting member and is in air communication with a vacuum pump at a side facing the supporting member.

4. The method according to claim 1, wherein the second vacuum pressure in the second interstice is generated by means of a vacuum pump that is in air communication with the second interstice, and a frame of the manipulator that is sealingly arranged at the construction part.

5. The method according to claim 1, wherein:
   the second interstice is confined by a frame of the manipulator, the construction part and the membrane, and
   the component becomes disposed in the second interstice following the disposing of the component at the at least one partial surface of the construction part.

6. The method according to claim 1, wherein:
   the supporting member comprises at least one through-channel that is in air communication with a vacuum pump and at least one air passage structure disposed at a side of the supporting member facing the membrane,
   the membrane is disposed at the at least one air passage structure, and
   air between the membrane and the supporting member is removed through the at least one air passage structure, so that the membrane displaces towards the supporting member and sealingly abuts the supporting member or the at least one air passage structure, so that the first vacuum pressure arises in the first interstice.

7. The method according to claim 6, wherein the membrane is sealingly spaced apart from the supporting member at least in an area of the at least one air passage structure via at least a first sealing member and/or an area sealing lip.

8. The method according to claim 1, wherein the component comprises a suction side, via which the component is fully aspirated by the manipulator, and an opposite side, via which the component is mounted onto the construction part.

9. The method according to claim 1, wherein at least one air passage structure is mounted or is molded or is replaceably disposed on an exterior side of the supporting member facing the membrane.

10. The method according to claim 1, wherein:
    the component is disposed at the at least one partial surface of the construction part by means of at least one sealing member, which becomes disposed between a frame of the manipulator and the construction part, so that the second interstice arises, and
    the component is mounted onto the construction part by:
        reducing the first vacuum pressure and/or increasing the second vacuum pressure, so that the component at least partially adheres to the construction part, and
        then further reducing the first vacuum pressure and/or increasing the second vacuum pressure and/or interrupting the first vacuum pressure at the construction part.

11. The method according to claim 1, wherein a first sealing member is arranged together with at least one air passage structure at the supporting member.

12. The method according to claim 1, wherein:
    the first vacuum pressure is generated by way of a first vacuum pump and the second vacuum pressure is generated by way of a second vacuum pump, and/or
    the first vacuum pump and/or the second vacuum pump are connected to a pressure controller such that the first vacuum pressure may be continuously or stepwise decreased and the second vacuum pressure may continuously or stepwise be increased during the mounting of the component onto the construction part.

13. The method according to claim 1, wherein a frame of the manipulator and the supporting member are spaced apart from each other, such that contact of an aspirated component by the frame is suppressed.

14. The method according to claim 1, wherein the component is formed with an adhesive layer, which, upon mounting the component to the construction part, is connected to the construction part.

15. The method according to claim 1, wherein the component is mounted to the construction part starting from a suction position, which is centrally located at the component to an edge of the component by increasing the difference between the first and second vacuum pressures, such that the component becomes disposed at least circumferentially without air entrapments at the construction part.

16. The method according to claim 1, wherein the component is mounted onto the construction part by evenly pressing the component across the at least one partial surface of the construction part.

17. The method according to claim 8, wherein the opposite side of the component is mounted to the construction part by being pressed and adhered to the construction part.

18. The method according to claim 11, wherein the first sealing member is replaceably and circumferentially arranged together with the at least one air passage structure at the supporting member.

* * * * *